(12) United States Patent
Le Gouic et al.

(10) Patent No.: US 7,455,235 B2
(45) Date of Patent: Nov. 25, 2008

(54) METHOD FOR MANUFACTURING A PRINTED SMART CARD WITH A VISUAL RELIEF EFFECT

(75) Inventors: Gaëtan Le Gouic, Meudon (FR); Eva Chignard, Meudon (FR)

(73) Assignee: Axalto S.A., Meudon (FR)

( * ) Notice: Subject to any disclaimer, the term of this patent is extended or adjusted under 35 U.S.C. 154(b) by 50 days.

(21) Appl. No.: 11/439,386

(22) Filed: May 23, 2006

(65) Prior Publication Data

US 2007/0272760 A1   Nov. 29, 2007

(51) Int. Cl.
*G06K 19/05* (2006.01)
(52) U.S. Cl. ........................ 235/492; 235/487
(58) Field of Classification Search ........... 235/492, 235/488, 487; 283/107–111, 904; 417/1, 417/7, 145, 469–471; 428/195.1
See application file for complete search history.

(56) References Cited

U.S. PATENT DOCUMENTS

| 5,106,126 A | * | 4/1992 | Longobardi et al. | 283/94 |
| 5,992,891 A | * | 11/1999 | Dyball | 283/89 |
| 6,042,888 A | * | 3/2000 | Sismanis et al. | 427/256 |
| 6,919,123 B2 | * | 7/2005 | Labrousse et al. | 428/195.1 |

* cited by examiner

*Primary Examiner*—Daniel St. Cyr
(74) *Attorney, Agent, or Firm*—Osha · Liang LLP

(57) ABSTRACT

A process for producing a printed smart card. The process includes applying a metallic ink on a first surface of a core of the smart card and coating only a portion of the metallic ink with a varnish. The process further includes laminating an overlay layer on the first surface after the applying the metallic ink and coating only the portion of the metallic layer with the varnish.

23 Claims, 5 Drawing Sheets

METHOD FOR MANUFACTURING A PRINTED SMART CARD WITH A VISUAL RELIEF EFFECT

BACKGROUND

1. Field of the Invention

The invention relates to a method for manufacturing a smart card that has a printed surface with optical effects. More particularly, the invention relates to a method for manufacturing a smart card, whose at least one main printed surface presents a visual relief effect.

2. Background Art

Practically, smart cards are divided into two categories. Smart cards of a first category use contact pads to connect electrically the microcontroller to the outside world. Smart cards of a second category use radio frequency waves to communicate. They comprise a radio frequency microcontroller electrically connected to an antenna.

In fact, this second category is itself divided into two groups. A first group comprises dual-interface cards, also called combi-cards, which comprise a radio frequency microcontroller electrically connected to both an antenna and a contact plate in order to transfer data to and from the card either by means of contact pads or by means of radio frequency waves, depending on the technology of the reader.

The second group comprises either contacless smart cards, which communicate only by means of radio frequency waves, or hybrid cards, which include two technologies to transfer different data. Hybrid cards may comprise for example a first electronic module connected to an antenna for radio frequency waves communication and another electronic module connected to a contact plate for transferring other data to or from this second module by means of contact pads.

In FIG. 1, a schematic conventional contactless smart card 10 is illustrated. The manufacture of contactless smart cards is usually based on a semi-finished product often called "pre-laminated inlet" 11. The inlet is usually made of at least four layers that are laminated. These layers comprise two layers 1 and 2 of plastic sheet, made of poly-vinyl-chloride (PVC) or of polyethylene-terephthalate (PET) for example, and two overlays layers 3 and 4. The inlet 11 hosts a copper wired antenna 5 connected to the contact pads of an electronic module 6. Then, at least one printed layer 8, 9, made of PVC for example, and at least one overlay layer 12, 13 are laminated with the inlet 11. The printed design is generally made by offset printing process or by silk screen printing process, for security purposes, such as the printing of a fluorescent ink which can only be seen under UV light, or for decorative or advertising purposes. The thickness of the printed layers 8, 9 is generally 150 µm and the thickness of the overlays 12, 13 is comprised between 50 µm and 100 µm.

FIG. 2 is a schema of a conventional smart card 20 with contact pads 21 substantially flushing with one of the main surfaces 22 of the smart card. The manufacture of such smart cards is usually based on a plastic sheet 11, made of poly-vinyl-chloride (PVC), of polyethylene-terephtalate (PET) or acrylonitrile-butadiene-styrene/poly-vinyl-chloride (ABS/PVC) for example. The plastic sheet 11 is either a single core or a split core. It is directly printed, front and reverse, by means of ink 26, 27. The plastic core 11 is then laminated between two overlay layers 12, 13 that are generally between 50 µm and 100 µm thick. Then, a cavity 24 is milled in the thus obtained plastic card body in order to affix an electronic module 25 in such a manner that contact pads 21 are flush with one main surface 22.

In the above described conventional processes for producing smart cards, at least one overlay layer is laminated on the printed surface(s). Such overlay is currently provided for protection purposes, against scratch for example.

Nowadays, there is a strong request for making smart cards which have an improved appearance, and particularly smart cards having a printed surface with optical effects. Namely, such optical effects are particularly required because they give the card a very distinguishable aspect and a high promotion value that reflects a prestigious image.

In this context, it has been tried to make smart cards having at least one main surface with a tri-dimensional visual effect. Such an effect is difficult to obtain and was never seen before.

SUMMARY

Considering the above, a problem intended to be solved by the invention is to provide a method for producing a printed smart card with optical effect on at least one of its main surfaces, said process allowing to obtain a smart card whose at least one of its printed main surfaces seems to be in relief, while it is flat. Moreover, the process must be as close as possible to a standard smart card manufacturing process. Namely it must use standard production tools, in order not to be expensive.

In order to solve this problem, the method of the invention comprises the following steps: applying a metallic ink on at least one surface of at least one plastic layer, coating at least partially said metallic ink with a varnish, laminating an overlay layer on the printed layer.

Thus, the lamination of an overlay layer onto the printed layer allows to obtain a difference in aspect between metallic ink which remains brilliant and the varnish which becomes dull, and thus contributes to obtain the required three-dimensional visual effect. Moreover, the overlay allows to obtain a flat surface.

Correlatively, the invention relates to a smart card, whose at least one of its main printed surfaces presents a relief effect, said printed surface comprising a metallic ink at least partially coated with a varnish, and being covered with an overlay layer.

Other aspects of the invention will be apparent from the following description and the appended claims.

BRIEF DESCRIPTION OF DRAWINGS

For a better understanding of the present invention, reference will now be made, by way of example, to the following description of the invention and to the accompanying drawings, in which.

DETAILED DESCRIPTION

Figure 1:
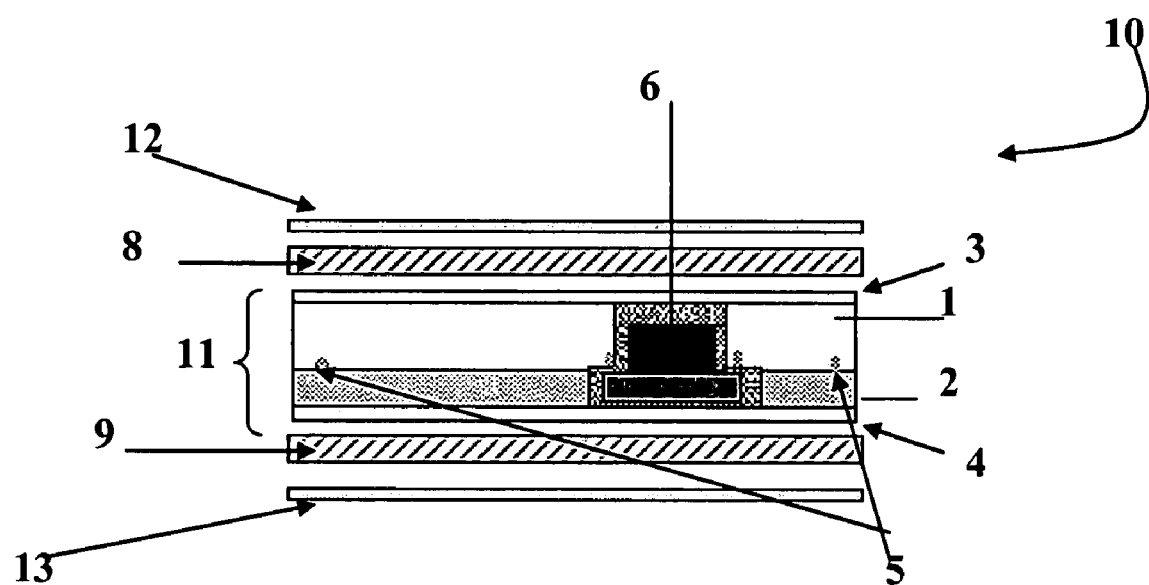
FIG. 1, already described, is a schematic cross-section illustrating a conventional contactless smart card.
Figure 2:
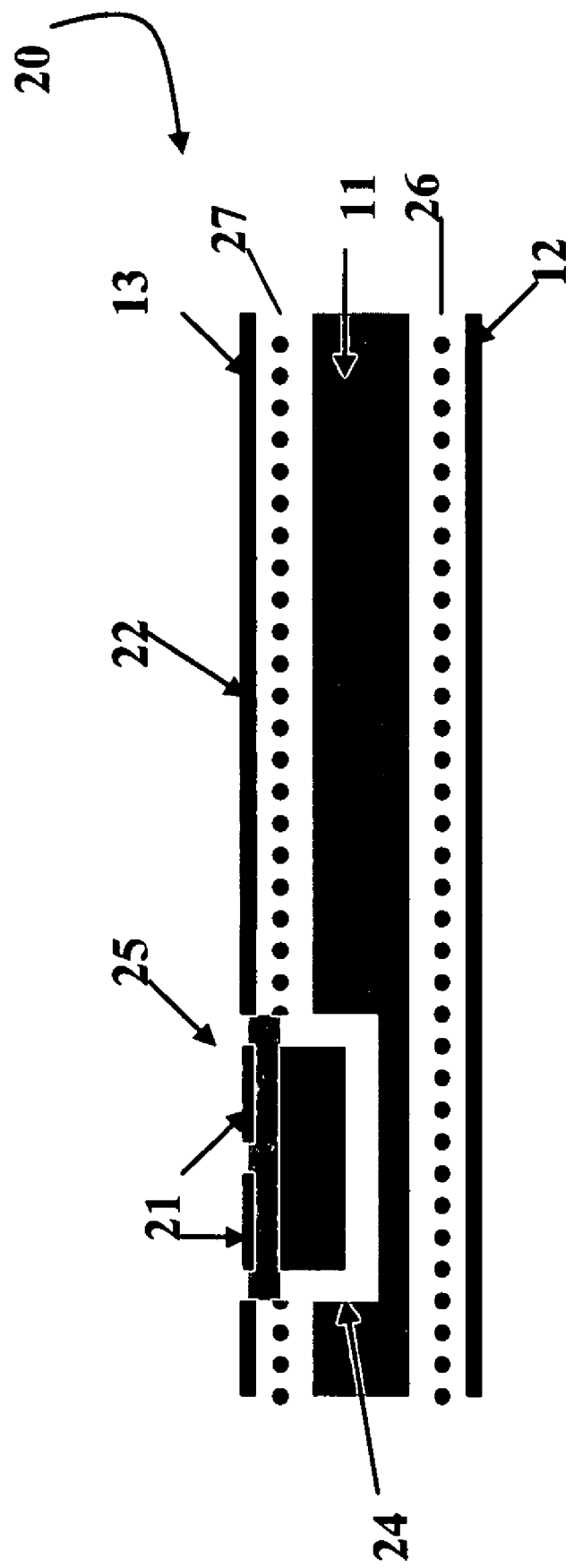
FIG. 2, already described, is a schematic cross-section illustrating a conventional smart card having contact pads that are substantially flush with one of the main surfaces of the card body.
Figure 3A:
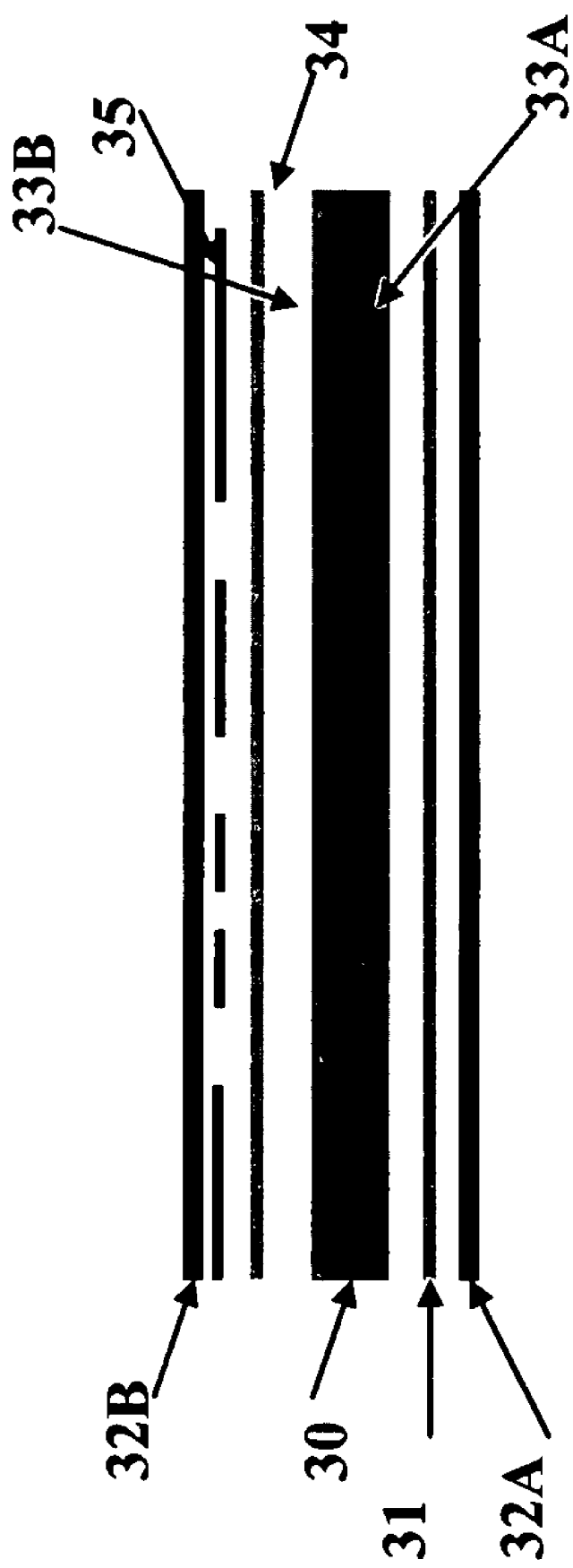
FIGS. 3A and 3B, are schematic cross-sections illustrating constitution layers of respectively a smart card using contacts to communicate and a smart card using at least radio frequency waves to communicate in accordance with one or more embodiments of the invention.
Figure 3B:
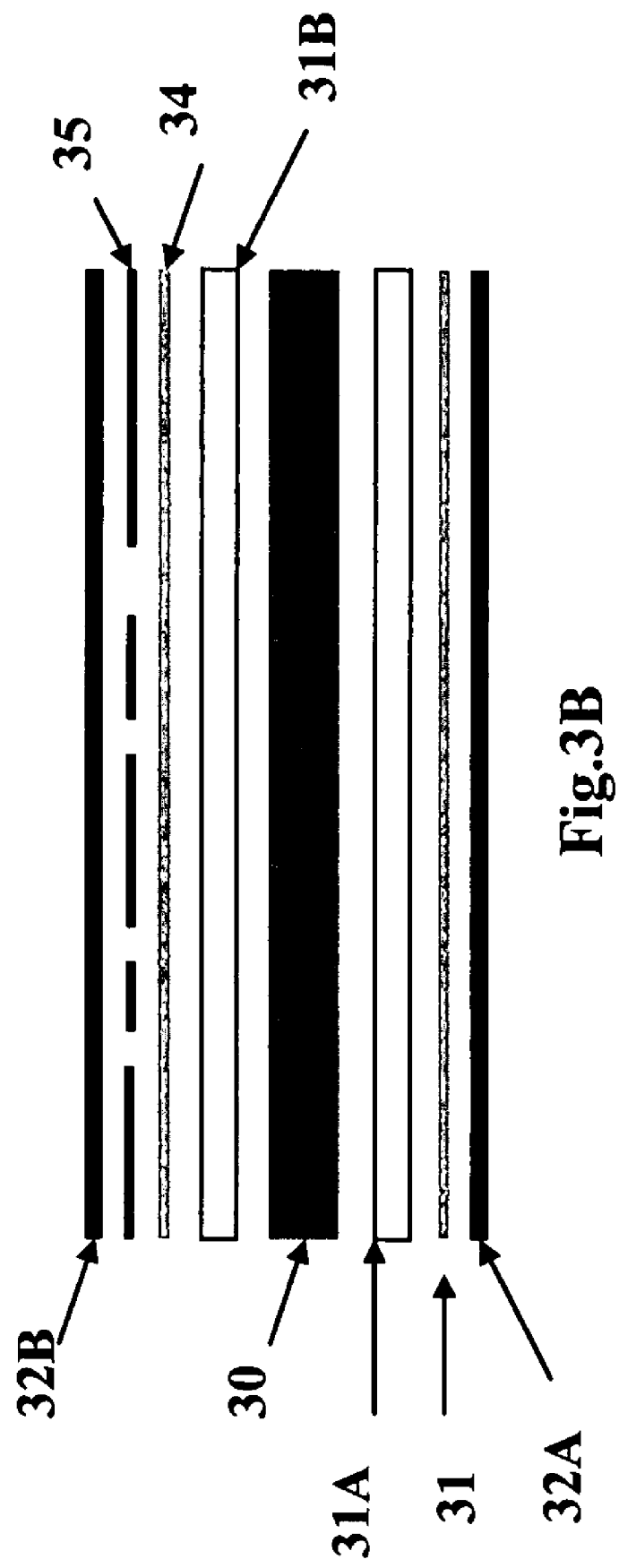

In FIGS. 3A and 3B, one can see the multilayer structure of a smart card. The invention applies to all type of smart card such as GSM card, bank card, access card, etc. The structure first comprises a core 30 made of PVC, ABS/PVC, or PET depending on the application to which the card is intended. If the card is intended to communicate at least by radio frequency waves, the core may comprise any electronic component such as at least an IC chip, an electronic module, an antenna or other.

In a first embodiment, the smart card is intended to use contact pads to communicate with the outside world (FIG. 3A). In this case, at least one of the main surfaces 33A, 33B of the core 30 constituting the card body is printed by direct application of an ink.

At least one main surface 33B is printed for obtaining a tri-dimensional visual effect, while the other surface 33A may be printed either in a conventional way or in such a manner that it presents also a visual relief aspect. A conventional printing process is made by applying a conventional ink 31 directly on the surface 33A of the core 30 either by means of a silk screen process or by means of an offset process.

For obtaining the required tri-dimensional effect on at least one main surface 33B, the method of printing comprises the step of applying a metallic ink 34 on the whole surface 33B of the core 30 and a second step of coating the metallic ink 34 with a varnish 35. Metallic ink 34 is at least partially coated with the varnish 35, so that the varnish is applied to create inscriptions, such as logo or text, on the surface of the metallic ink. Then, standard overlay layers 32A, 32B are laminated on main printed surfaces 33A, 33B of the core 30.

In a second embodiment, the smart card is intended to use at least radio-frequency waves to communicate with the outside world. Referring to FIG. 3B, in this case, at least one of the main surfaces of the core 30 is coated by an additional printed plastic layer 31A, 31B. Finally, overlay layers 32A and 32B are provided on both main surfaces of the card.

At least one additional printed plastic layer 31B is made for obtaining a tri-dimensional effect. If a second printed layer 31A is provided, it may be printed either in a conventional way or in such a manner that it presents also a tri-dimensional effect. A conventional printed layer 31A is made by applying a conventional ink 31 on a plastic sheet 31A either by means of a silk screen process or by means of an offset process.

For obtaining a relief aspect on the printed layer 31B, the method comprises a first step of applying a metallic ink 34 on the whole surface of the plastic layer 31B and a second step of coating at least partially the metallic ink 34 with a varnish 35.

A standard overlay layer 32B, made of PVC for example, is then applied onto the printed layer 31B and laminated. Preferably, the core 30, the printed layer (s) 31A, 31B and the overlay layers 32A, 32B are joint together by means of a hot lamination process.

In both embodiments, the varnish 35 is preferably applied in a viscous state and then, it is polymerized by means of ultraviolet rays. Moreover, in order to create a relief aspect, the UV varnish is not applied on the whole surface of the metallic ink 34, but it is applied by means of silk screen printing process in order to alternate areas with UV varnish and areas without UV varnish and thus to create a drawing or a text.

The UV varnish is preferably chosen to be transparent in order to preserve the same color on the surface of the card.

One can for example use the UV varnish commercialized by Sericol under the reference UVIVID CN 622.

Preferably, the metallic ink 34 and the UV varnish 35 are applied by means of a silk-screen printing process. The use of a silk screen process is a standard printing process that is currently used in the card manufacturing processes and that is integrated in standard production lines. Consequently, the process for producing a printed smart card with a relief effect is of low cost and there is no extra cost compared to standard silk-screen inks.

Preferably, the mesh used for the silk-screen process is equal to 54. With such a mesh the obtained tri-dimensional aspect is optimum. If the size of the mesh is smaller, for example a mesh 77, then the quantity of ink and varnish applied is not sufficient to obtain a relief effect. On the other hand, if the size of the mesh is higher, the quantity of ink and varnish that are applied is too large so that tri-dimensional effect loses fineness.

In order to obtain a required relief effect with an optimum fineness, the thickness of the applied metallic ink 34 is advantageously comprised between 6 and 12 µm and the thickness of the varnish 35 is comprised between 16 and 24 µm. More advantageously, the thickness of the metallic ink is about 10 µm and the thickness of the varnish is about of 20 µm.

The overlay layer(s) 32A, 32B is a conventional overlay, whose thickness is in the range between 50 µm and 100 µm.

Figure 4:
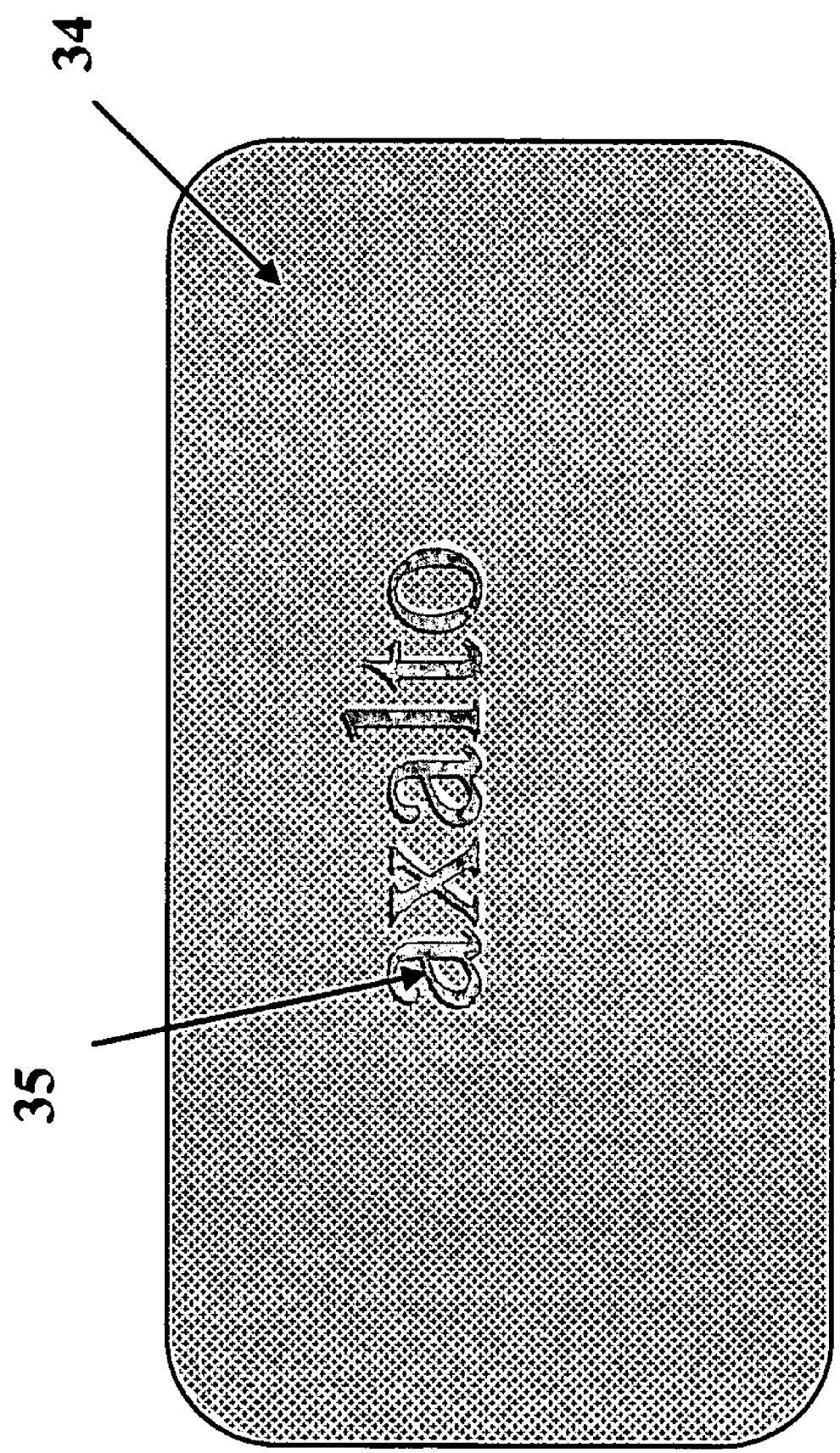
FIG. 4, is a schematic front view illustrating a main surface of a smart card, that holds an inscription having a tri-dimensional visual aspect in accordance with one or more embodiments of the invention.

In both embodiments, the tri-dimensional aspect is obtained thanks to the application of the metallic ink 34 followed by the creation of an inscription by means of the varnish 35 applied on the metallic ink, and finally to the hot lamination step. Namely, after the hot lamination of the overlay layer 32B onto the printed surface comprising a metallic ink 34 and an UV varnish 35, the varnish becomes dull while the metallic ink remains brilliant. This difference of aspect between the metallic ink and the inscription made of UV varnish contributes to obtain a tri-dimensional effect. The inscription made of dull UV varnish 35 appears to be engraved in the surface of the card (see FIG. 4).

Moreover, the overlay layer 32B allows to erase the existing extra-thickness due to the presence of the inscription made of varnish 35, applied by means of a silk screen printing process on the metallic ink. Thus, the surface of the finished card is flat, while it holds an inscription (drawing and/or text) which appears to be in relief.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A process for producing a smart card comprising:
    applying a metallic ink on a first surface of a core of the smart card;
    coating only a portion of the metallic ink with a varnish to form an inscription; and
    laminating a first overlay layer on the first surface after the applying the metallic ink and coating only the portion of the metallic layer with the varnish.

2. The process of claim 1, wherein the varnish is applied in a viscous state and is then polymerized using ultraviolet rays.

3. The process of claim 1, wherein the steps of applying the metallic ink and the varnish are made by means of a silk-screen printing process.

4. The process of claim 1, wherein the thickness of metallic ink lies between 6 and 12 µm.

5. The process of claim 1, wherein the thickness of varnish lies between 16 and 24 µm.

6. The process of claim 1, wherein applying the metallic ink to the first surface comprises applying the metallic ink over the entire first surface.

7. The process of claim 1, further comprising:
applying conventional ink on a second surface of the core;
laminating a second overlay layer on the second surface after the applying the conventional ink.

8. The process of claim 1, wherein the coating of only the portion of the metallic ink with the varnish creates an inscription on the first surface of the core.

9. The process of claim 1, wherein the thickness of metallic ink lies between 6 and 12 μm and the thickness of varnish lies between 16 and 24 μm.

10. The process of claim 1, wherein the core comprises at least one selected from a group consisting of an integrated circuit (IC), an electronic module, and an antenna.

11. A smart card, comprising:
a core comprising a first surface and a second surface;
a first printed layer coated with metallic ink, wherein only a portion of the metallic ink is covered with varnish to form an inscription; and
a first overlay layer laminated over the first printed layer, wherein the first printed layer is interposed between the first overlay layer and the first surface of the core.

12. The smart card of claim 11, wherein the varnish is applied to the metallic ink in a viscous state and is then polymerized using ultraviolet rays.

13. The smart card of claim 11, wherein the thickness of metallic ink ranges from 6-12 μm.

14. The smart card of claim 11, wherein the thickness of varnish ranges from 16-24 μm.

15. The smart card of claim 11, further comprising:
a second printed layer comprising conventional ink; and
a second overlay layer laminated over the second printed layer.

16. The smart card of claim 11, wherein the core comprises at least one selected from a group consisting of an integrated circuit (IC), an electronic module, and an antenna.

17. The smart card of claim 11, wherein the thickness of metallic ink lies between 6 and 12 μm and the thickness of varnish lies between 16 and 24 μm.

18. A process for producing a smart card, comprising:
applying a metallic ink on one surface of a plastic layer,
coating only a portion of the metallic ink with a varnish to form an inscription; and
laminating the plastic layer to a first surface of a core of the smart card after applying the metallic ink and coating only the portion of the metallic ink with the varnish;
laminating an overlay layer on the second surface of the core.

19. The process of claim 18, wherein the thickness of metallic ink lies between 6 and 12 μm and the thickness of varnish lies between 16 and 24 μm.

20. The process of claim 18, wherein laminating the plastic layer and the overlay layer occur simultaneously.

21. A smart card, comprising:
a core comprising a first surface and a second surface, wherein the first surface of the core is coated with metallic ink and only a portion of the metallic ink is covered with varnish to form an inscription;
a first overlay layer laminated over the first surface; and
a second overlay layer laminated over the second surface.

22. The smart card of claim 21, wherein the thickness of metallic ink lies between 6 and 12 μm and the thickness of varnish lies between 16 and 24 μm.

23. The smart card of claim 21, wherein the core comprises at least one selected from a group consisting of an integrated circuit (IC), an electronic module, and an antenna.

* * * * *